United States Patent
Singhal et al.

(12) 
(10) Patent No.: US 11,907,551 B2
(45) Date of Patent: Feb. 20, 2024

(54) PERFORMANCE EFFICIENT AND RESILIENT CREATION OF NETWORK ATTACHED STORAGE OBJECTS

(71) Applicant: Dell Products, L.P., Hopkinton, MA (US)

(72) Inventors: Maneesh Singhal, Bangalore (IN); Venu Madhava Gunda, Bangalore (IN)

(73) Assignee: Dell Products, L.P., Hopkinton, MA (US)

( * ) Notice: Subject to any disclaimer, the term of this patent is extended or adjusted under 35 U.S.C. 154(b) by 19 days.

(21) Appl. No.: 17/855,901

(22) Filed: Jul. 1, 2022

(65) Prior Publication Data

US 2024/0004563 A1 Jan. 4, 2024

(51) Int. Cl.
G06F 3/06 (2006.01)

(52) U.S. Cl.
CPC ............ G06F 3/0631 (2013.01); G06F 3/067 (2013.01); G06F 3/0619 (2013.01); G06F 3/0664 (2013.01)

(58) Field of Classification Search
CPC .... G06F 3/0631; G06F 3/0619; G06F 3/0664; G06F 3/067
See application file for complete search history.

(56) References Cited

U.S. PATENT DOCUMENTS

| | | | | |
|---|---|---|---|---|
| 6,631,442 B1* | 10/2003 | Blumenau | ............. | G06F 3/0685 |
| | | | | 711/170 |
| 8,046,460 B1* | 10/2011 | Greenidge | ............ | G06F 3/0635 |
| | | | | 709/225 |
| 10,712,948 B1* | 7/2020 | Davis | .................... | G06F 3/0631 |
| 2005/0114595 A1* | 5/2005 | Karr | ....... | G06F 3/0664 |
| | | | | 711/114 |
| 2007/0214338 A1* | 9/2007 | Mizuno | ................. | G06F 3/0644 |
| | | | | 711/170 |
| 2007/0300033 A1* | 12/2007 | Kano | .................... | G06F 3/0689 |
| | | | | 711/170 |
| 2013/0111034 A1* | 5/2013 | Upadhya | ............... | G06F 3/0605 |
| | | | | 709/226 |
| 2016/0034492 A1* | 2/2016 | Harrison | ............... | G06F 3/0608 |
| | | | | 707/827 |

* cited by examiner

*Primary Examiner* — Eric T Loonan
(74) *Attorney, Agent, or Firm* — Anderson Gorecki LLP

(57) ABSTRACT

Storage volumes are pre-provisioned in the operating system of a storage system before they are required to be assigned to an emulation on the storage system. Details of the previously created storage volumes are stored in a management database. If a storage volume is required, the process that needs the storage volume obtains details about a pre-provisioned storage volume from the management database, and instructs the storage system operating system to add the storage volume to a storage group for the process. By pre-provisioning storage volumes in the operating system, it is possible to greatly reduce the amount of time it takes to add storage volumes to processes. The number of storage volumes to be pre-created can be determined based on a regression between the previous storage volume usage and time, and a deterministically obtained value of a number of filesystems that will be created in an upcoming time interval.

14 Claims, 9 Drawing Sheets

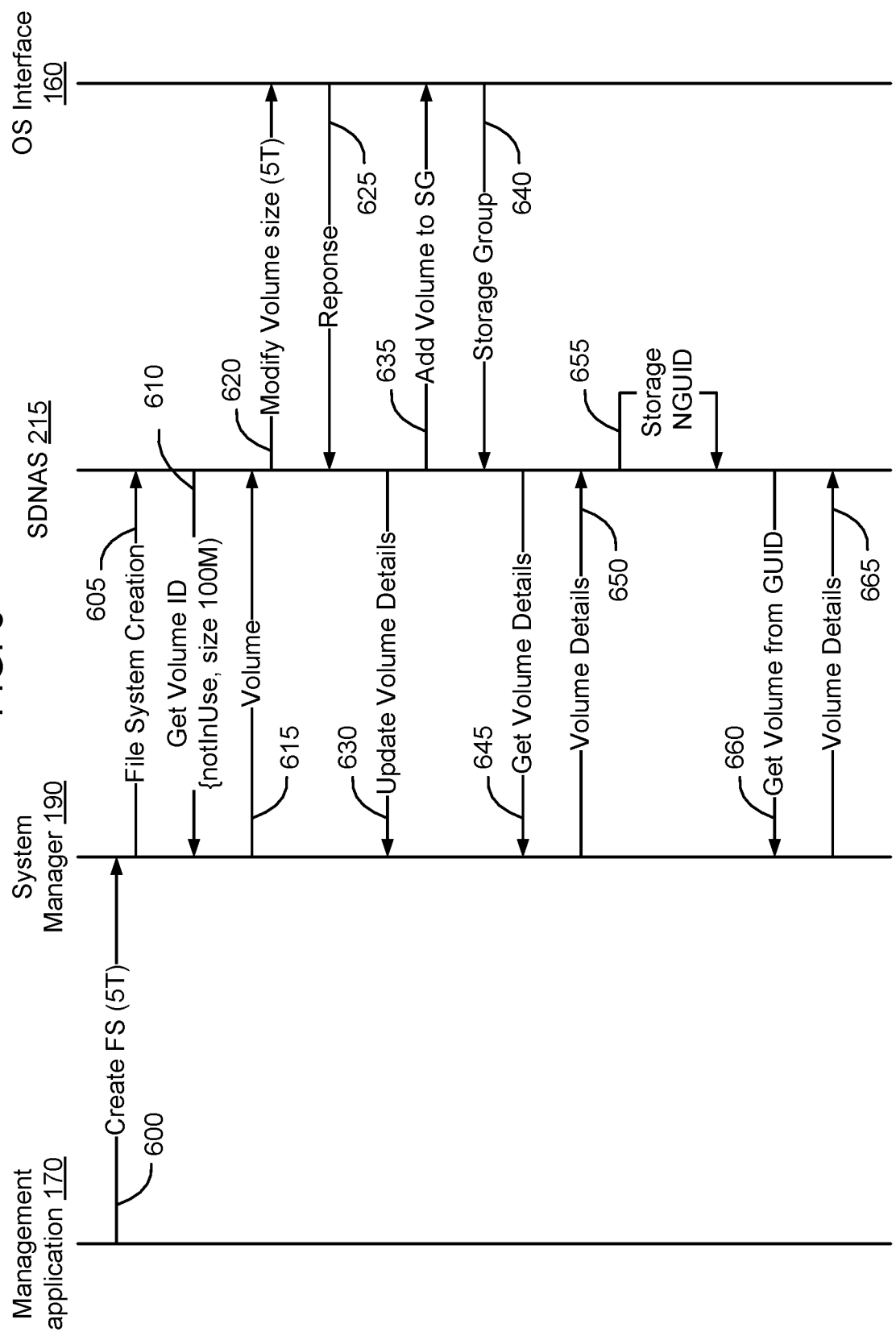

FIG. 7

```
@Timeout(day=1)
Long Integer getNoOfVolumesToCreate() {
    List listFsSystemCreationTime = new getFileSystemsCreationFor25Days();  ← 700
    Long probFsCreateCount = getMLLinearRegression(currentDate, listFsSystemCreationTime);  ← 702
    List listNsCreationTime = new getNsCreationFor25Days();  ← 704
    Long probNsCreateCount = getMLLinearRegression(currentDate, listFsSystemCreationTime);  ← 706
    Long untilizedVolume = getNumberUnutilizedVolumes();  ← 708
    return ((listNsCreationTime) * 2 + probFsCreateCount - untilizedVolume)  ← 710
}
```

FIG. 9

```
@Timeout(minutes=30)  ← 900
getSnapVolumeCountToCreate() {
    List<SnapSchedule> snapSchedules = getSnapSchedulersFromSystemDbMangerDB(); ← 902
    currentTime = System.currentTimeInMillis(); ← 904
    List listOfVolumesRequiredToCreate = new ArrayList();
    currentTimePlus30Minutes = System.currentTimeInMillis() + System.Minutes(30).getInMilliseconds; ← 906
    for(SnapsChedule snapSchedule: snapSchedules)
    {
        Long interval = null;
        Long timeOfDay = null;
        Long dayOfWeek = null;
            Long baseTime = snapSchedule.getFileSystemAttachTime()
        if (snapSchedule.getInterval() != null) {
            interval = snapSchedule.getInterval();
        } else if (snapSchedule.getTimeOfDay() != null && snapSchedule.getDayOfWeek()) {
            timeOfDay = snapSchedule.getTimeOfDay();
            dayOfWeek = snapSchedule.getDayOfWeek();
        } else {
            timeOfDay = snapSchedule.getTimeOfDay();
        }   ← 908
        Set<Long> listScheduleTimings = generateTimeSchedules (baseTime, interval, timeOfDay, dayOfWeek);
        for (Long schedule : listScheduleTimings) {
            if (schedule > currentTime && schedule < currentTimePlus30Minutes) {
                listOfVolumesRequiredToCreate(snapSchedule.getFileSystems().size()); ← 912
                break;
            }
        }   ← 910
    }
    return listOfVolumesRequiredToCreate;
}
```

PERFORMANCE EFFICIENT AND RESILIENT CREATION OF NETWORK ATTACHED STORAGE OBJECTS

COPYRIGHT NOTICE

A portion of the disclosure of this patent document contains material which is subject to copyright protection. The copyright owner has no objection to the xerographic reproduction by anyone of the patent document or the patent disclosure in exactly the form it appears in the Patent and Trademark Office patent file or records, but otherwise reserves all copyright rights whatsoever.

FIELD

This disclosure relates to computing systems and related devices and methods, and, more particularly, to a method and apparatus for performance efficient and resilient creation of network attached storage objects.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

Storage volumes are pre-provisioned in the operating system of a storage system before they are required to assigned to an emulation on the storage system. Details of the previously created storage volumes are stored in a management database. If a Software Defined Network Attached Storage (SDNAS) process is started in an emulation on the storage system, the SDNAS obtains details about two or more of the previously created storage volumes, and instructs the storage system operating system to add the storage volumes to a storage group for the SDNAS process. Once the storage volumes have been added to the storage group, the SDNAS process instructs the operating system to create a masking view of the storage group to make the storage volumes visible to the SDNAS process. By pre-provisioning the storage volumes in the operating system, it is possible to greatly reduce the amount of time it takes to start a SDNAS instance on the storage system. Further, since the storage volumes are previously created, and simply masked to the SDNAS process, the possibility of failure is greatly reduced, since the operating system does not need to create the storage volumes in connection with starting the SDNAS process.

Storage systems can also be pre-provisioned having a default size for use with user filesystems, and once allocated to the user filesystems, re-sized to accommodate an expected size of the user filesystem.

The number of pre-provisioned filesystems can be determined in advance, for example using a learning process that is configured to learn a regression between the number of SDNAS instances created over time, and the number of user filesystems created over time. Snapshot schedules are also used to determine, in advance, how many storage volumes should be pre-created at any given time period.

BRIEF DESCRIPTION OF THE DRAWINGS

FIG. 6 is a swim-lane diagram showing interaction between a set of components of a storage system in connection with increasing a size of a pre-provisioned file system, according to some embodiments.

FIG. 7 is a table containing pseudocode configured to determine how many storage volumes should be pre-provisioned on a storage system based on historical storage volume consumption, according to some embodiments.

FIG. 9 is a table containing pseudocode configured to determine how many storage volumes should be pre-provisioned on a storage system based on an expected number of snapshots that will be created in an upcoming time interval.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
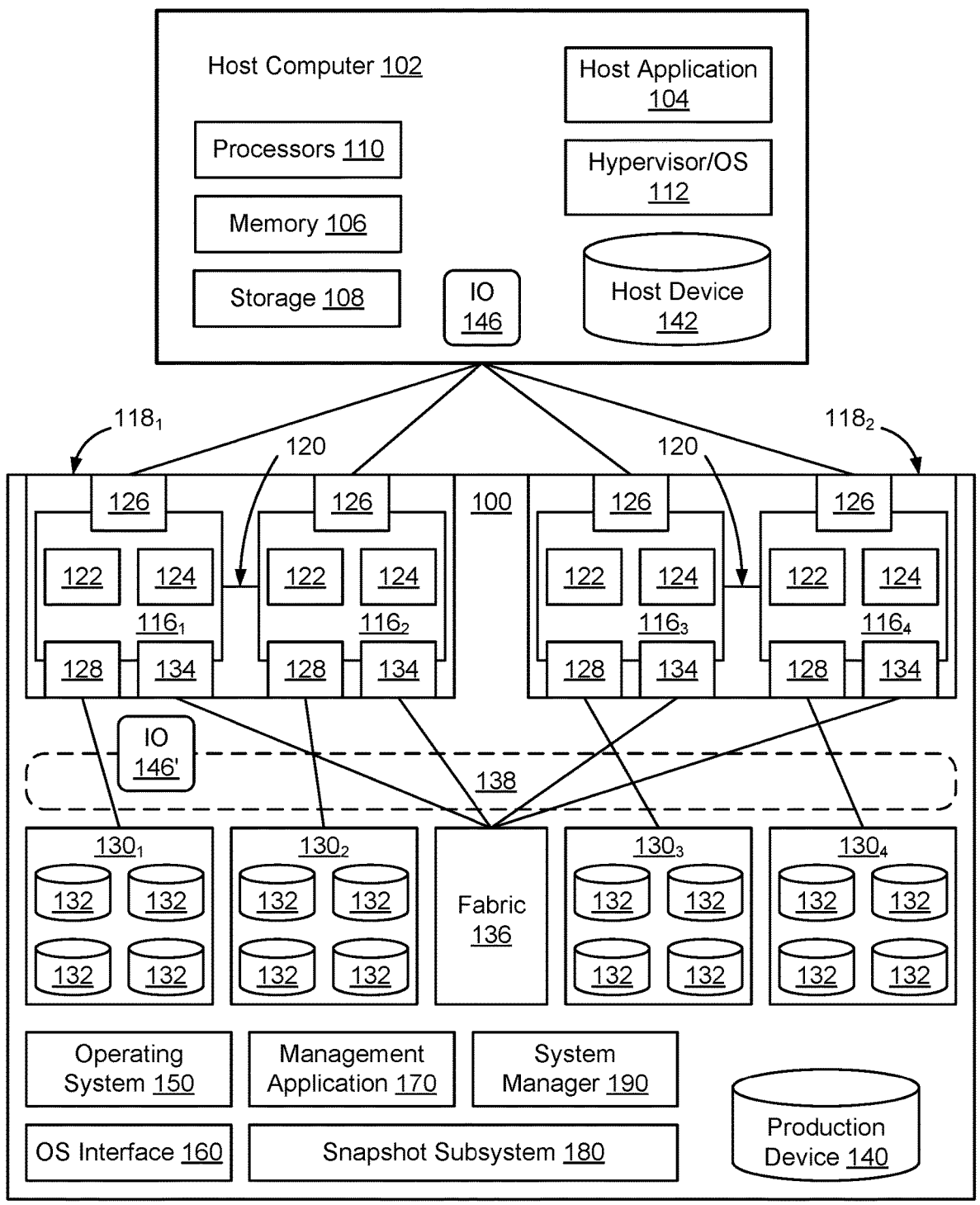
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g. including multiple CPUs, GPUs, and combinations thereof. The local volatile memory 124 may include, for example and without limitation, any type of RAM. Each compute node 116 may also include one or more front-end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132.

A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using InfiniBand. Each compute node 116 may allocate a portion or partition of its respective local volatile memory 124 to a virtual shared "global" memory 138 that can be accessed by other compute nodes 116, e.g. via DMA (Direct Memory Access) or RDMA (Remote Direct Memory Access). Shared global memory 138 will also be referred to herein as the cache of the storage system 100.

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared global memory 138 and the managed drives 132. In response to an IO (Input/Output command) 146 from the host application 104 to the host device 142, the hypervisor/OS 112 determines whether the IO 146 can be serviced by accessing the host volatile memory 106. If that is not possible then the IO 146 is sent to one of the compute nodes 116 to be serviced by the storage system 100.

In the case where IO 146 is a read command, the storage system 100 uses metadata to locate the commanded data, e.g. in the virtual shared global memory 138 or on managed drives 132. If the commanded data is not in the virtual shared global memory 138, then the data is temporarily copied into the virtual shared global memory 138 from the managed drives 132 and sent to the host application 104 by the front-end adapter 126 of one of the compute nodes $116_1$-$116_4$. In the case where the IO 146 is a write command, in some embodiments the storage system 100 copies a block being written into the virtual shared global memory 138, marks the data as dirty, and creates new metadata that maps the address of the data on the production device 140 to a location to which the block is written on the managed drives 132.

Figure 2:
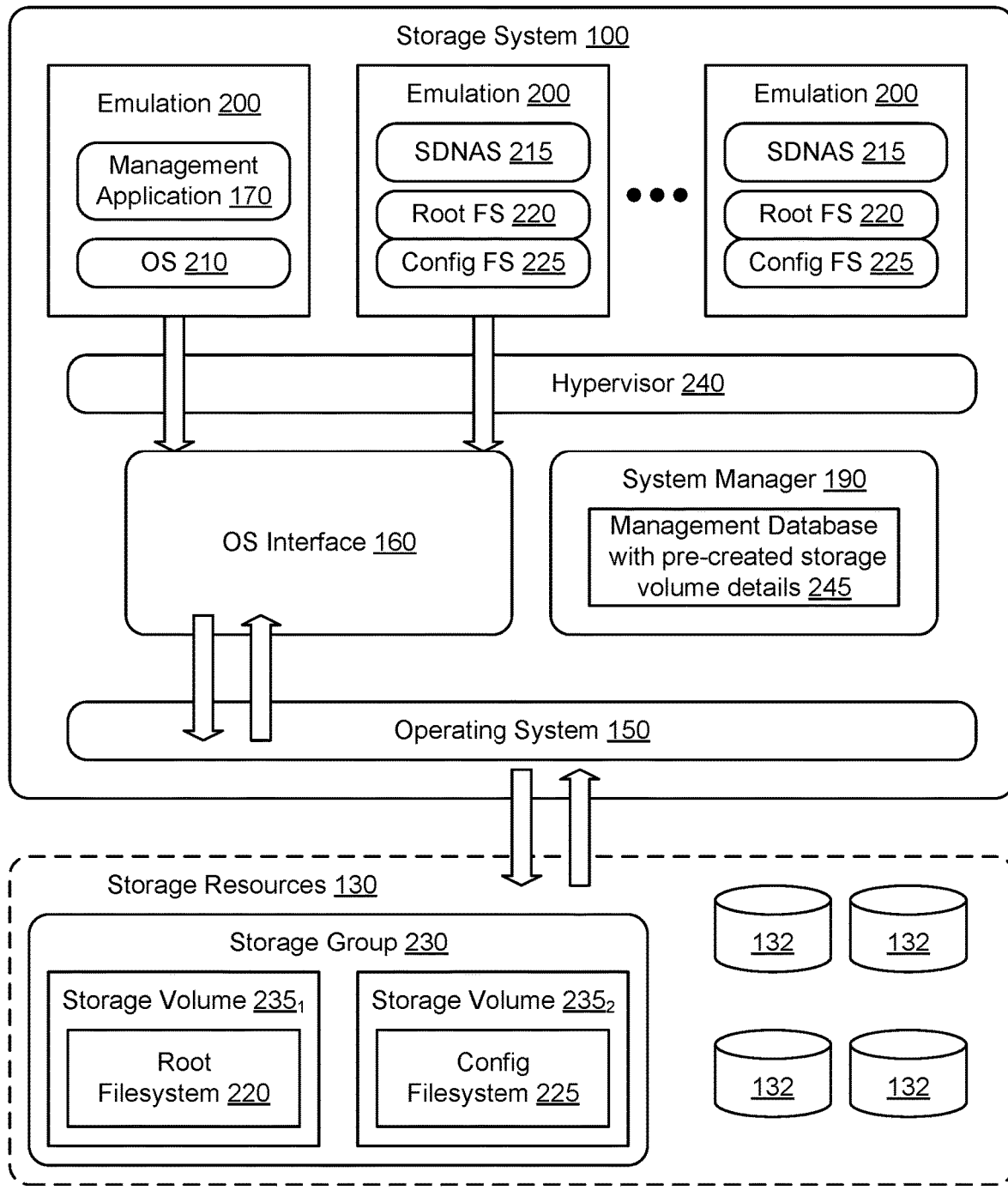
FIG. 2 is a functional block diagram of an example storage system showing aspects of a storage system management system in greater detail, according to some embodiments.

FIG. 2 is a functional block diagram of an example storage system showing aspects of a storage system management system in greater detail, according to some embodiments. As shown in FIG. 2, in some embodiments a storage system has a hypervisor 240 that abstracts physical resources of the storage system 100 from a set of emulations 200. Example emulations might be implemented as virtual machines. Each emulation 200 has a local operating system 210, and one or more applications executing in the context of the local operating system 210. Some of the emulations, as shown in FIG. 2, might include a management application 170 configured to implement management operations on the storage system 100 to configure operation of the storage system 100. Example configuration operations might include creating storage volumes for use by host applications 102, setting storage policies regarding backup operations, setting snapshot policies be implemented by snapshot subsystem 180 on storage volumes of storage groups, creating other protection mechanisms for the storage volumes, and myriad other operations. Management applications 170 generate system calls (syscalls) configured to be sent to storage system operating system 150 via an operating system (OS) interface 160. In some embodiments the OS interface is a Representational State Transfer (REST) interface configured to enable the management application 170, system manager 190, SDNAS process 215, and other entities to take action on the storage system to create and manage objects in the storage system operating system.

Storage systems provide storage services for hosts. Management applications implement management operations on the storage system to configure operation of the storage system for use by the hosts, by passing system calls to an operating system controlling operation of the storage system. Example management operations might be, for example, to create a logical storage volume, create a storage group, add storage volumes to storage groups, and create masking views to enable the storage volumes and storage groups to be visible to processes such as network attached storage servers.

Each filesystem or snapshot of a filesystem is mapped to one or more storage volumes (device). Whenever a user requests creation of these objects, a set of system calls (syscalls) are used to create the device and get the details of the device. In instances where the device is to be used for Network Attached Storage (NAS), in some embodiments, any device that is created needs to be mapped to two Software Defined Network Attached Storage (SDNAS) nodes for redundancy purposes.

Where a new SDNAS instance is to be created, in some embodiments each SDNAS needs two internal filesystems, which require creation of two devices—a first device for a root filesystem, and a second device for a configuration filesystem. If there are a low number of block objects (storage volumes and storage groups) created on the storage system, it can take on the order of 20 seconds for the storage system to create all the constructs required to create a new filesystem. Since creation of a new SDNAS instance requires two filesystems, in some instances it can take 40 seconds or longer to create a set of filesystems required to implement the SDNAS instance on an emulation in the storage system. Where the storage system is experiencing a high workload, this process can take several minutes, thus possibly causing creation of the SDNAS instance to timeout. Where the SDNAS creation process times out, the timeout condition can itself add additional complexity to system management, since any previously created objects will need to be handled by removing the stale objects or rolling back the system to a previous state.

In some storage systems, device creation is one of the most expensive operations, in terms of the number of operations required to implement the system calls in the operating system. Further, in some storage systems, device creation requests are used to create exactly one device. So, if the user wants to create N filesystems, the storage system management system will need to individually instruct the storage system operating system to create one filesystem N times. Where a customer would like to set up a number of SDNAS instances, this can be time consuming. Further, in some embodiments, creation of objects such as storage devices, storage groups, and masking views on the storage system involves multiple layers such as a management system, operating system interface, and operating system, each of which has its own concurrency defined based on its own code and the services available from its below layers. Given the differences in concurrency at different layers, the modules can become overloaded at times, which can cause delays in object creation and failures. Failure at one of the layers may require rollback operations, that consumes additional resources at that layer and at one or more of the other layers.

As shown in FIG. 2, in some embodiments the storage system includes a system manager 190 configured to maintain a management database 245. As discussed in greater detail herein, in some embodiments the management database 245 is configured to store details about storage volumes that are pre-provisioned by the storage system operating system before they are required for use by applications in one or more of the emulations 200.

When a process such as an SDNAS process 215 is started in an emulation 200, the SDNAS process 215 obtains a first pre-provisioned storage volume $235_1$ from the system manager 190 to be used to hold root filesystem 220, and obtains a second pre-provisioned storage volume $235_2$ from the system manager 190 to be used to hold the configuration filesystem 225. In some embodiments, the storage volume $235_1$ configured to hold the root filesystem 220 has a default size of 3 G and the storage volume $235_2$ configured to hold the config filesystem 225 has a default size of 6 G. Accordingly, in some embodiments the pre-configured filesystems that are configured in advance are created to have sizes of 3 G and 6 G respectively. Other default sizes may be used as well, depending on the implementation. The storage volumes re added to a storage group 230, and a masking view is created by the operating system to make the storage volumes of the storage group 230 visible to the SDNAS 215 in the emulation 200. The SDNAS 215 optionally may also obtain one or more pre-configured storage volumes for use in connection with storing user filesystems (not shown) which are also added to the storage group 230 and become part of the masking view for the SDNAS.

Figure 3:
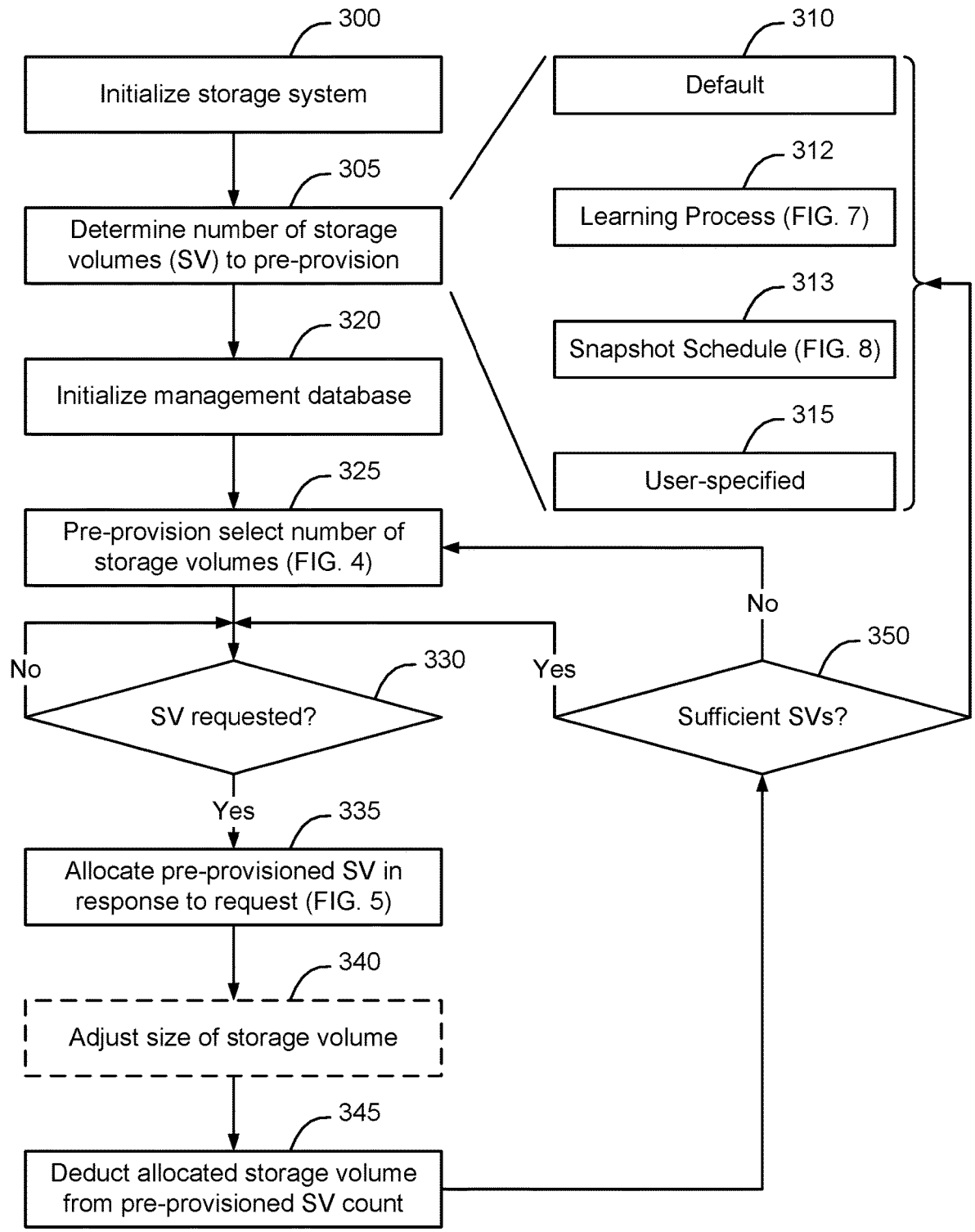
FIG. 3 is flow chart of a process used by the management system to pre-provision a number of storage volumes and allocate the pre-provisioned storage volumes to processes upon request, according to some embodiments.

FIG. 3 is flow chart of a process used by the management system to pre-provision a number of storage volumes and allocate the pre-provisioned storage volumes to processes upon request, according to some embodiments. As shown in FIG. 3, when the storage system is initialized (block 300) a determination is made as to the number of pre-provisioned storage volumes that should be created (block 305). In some embodiments, the storage system creates a default number of pre-provisioned storage volumes (block 310). For example, the storage system may create sufficient storage volumes for 5, 10, 25, etc., SDNAS processes. The default number of pre-provisioned storage volumes, and the sizes of the pre-provisioned storage volumes, may be based on a learning process (block 312). An example learning process is described in connection with FIG. 7. The default number of pre-provisioned storage volumes may also included a deterministic number of storage volumes, which is based, for example, when filesystems are scheduled to be created on the storage system (block 313). An example of scheduled file system creation is described in connection with FIGS. 8 and 9 in connection with creation of snapshots based on snapshot policies. The number of pre-provisioned storage volumes may also be manually set by a user (block 315) for example via the management application 170.

In embodiments where each SDNAS process will require one 3 G storage volume for the root FS 200, one 6 G storage volume for the config FS 225, and one or more 100M storage volumes for data filesystems, creating sufficient storage volumes for 5 SDNAS processes would result in creation of five 3 G storage volumes, five 6 G storage volumes, and ten 100 M storage volumes. While this will use some storage, e.g. up to about 50 G worth of storage, having the pre-provisioned devices created in advance can dramatically accelerate the process of initializing one or more SDNAS instances, when compared to a process of creating the storage volumes after starting the process of initializing the SDNAS instance. Further, since pre-provisioning the storage volumes occurs as a background process, it is possible to pre-provision the storage volumes in a way that doesn't impact other user-driven operations.

As shown in FIG. 3, in addition to determining the number of pre-provisioned devices to be created (block 305) in some embodiments a management database 245 is initialized (block 320) that will be used to store details about the pre-provisioned storage volumes. Although FIG. 3 shows the management database 245 as being initialized (block 320) after determining the number of devices (block 305), the order of these steps may be rearranged or may be implemented simultaneously depending on the implementation. Optionally, the step of initializing the management database 245 may be omitted, for example where another database that is otherwise being used on the storage system is determined to be used to maintain the details about the pre-provisioned storage volumes.

The determined number of storage volumes are then pre-provisioned in the storage system (block 325). Additional details about some steps that may be used to pre-provision one or more storage volumes are provided in connection with FIG. 4.

Once one or more of the pre-provisioned storage volumes have been created, the pre-provisioned storage volumes may be assigned to one or more processes (block 330). The storage system waits (a determination of NO at block 330) to receive a request for allocation of a pre-provisioned storage volume. When a request for a storage volume is received (a determination of YES at block 330), one of the pre-provisioned storage volumes devices is allocated in response to the request (block 335). Additional details associated with the process of allocating a pre-provisioned storage volume are provided in connection with FIG. 5. Optionally, if the pre-provisioned storage volume is not of the correct size, the size of the storage volume may be adjusted (block 340). Block 340 is shown in dashed lines to indicate that this is optional, since the pre-provisioned storage volume in some instances might be correctly sized when pre-provisioned and, hence, adjusting the size might only be required in some instances. In some embodiments, modifying the size of a storage volume takes on the order of 2-3 seconds, whereas provisioning a storage volume takes on the order of 6-8 seconds. Accordingly, using a pre-provisioned storage volume and adjusting the size of the storage volume (block 340) is still faster than creating the storage volume in response to receiving a request for a storage volume from a process. Additional details associated with the process of modifying a size of an allocated pre-provisioned storage volume are provided in connection with FIG. 6.

In some embodiments, the system manager 190 maintains a count of how many pre-provisioned storage volumes are currently created and available to be allocated, and optionally the size of the pre-provisioned storage volumes. For example, in some embodiments, when a pre-provisioned storage volume is allocated to a process such as a SDNAS process, the storage manager deducts the allocated storage volume from the pre-provisioned storage volume count (block 345) and compares the number of currently pre-provisioned storage volumes with a threshold (block 350). The threshold may be based, in some embodiments, based on the factors described above in connection with blocks 310, 312, 313, and 315. If there are sufficient remaining pre-provisioned storage volumes (a determination of YES at block 350) the process returns to block 330 to wait for receipt of additional storage volume allocation requests. If the number of pre-provisioned storage volumes is less than a threshold number (a determination of NO at block 350) the process returns to block 325 to pre-provision a select number of additional storage volumes.

In some embodiments, the system manager 190 includes a background thread that implements continuous learning of the number of storage volumes requested that are requested over time (block 312). The system manager 190 may maintain information about the frequency of creation of filesystems, the frequency of creation of SDNAS processes, and other events that result in allocation of pre-provisioned storage volumes. These learned values are used to adjust the threshold used at box 350 to enable the system manager to dynamically adjust the number of storage volumes that are pre-provisioned on the storage system at a given point in time. In some embodiments, the system manager 190 also determines, in advance, a number of filesystems that are scheduled to be created in an upcoming time interval and pre-provisions storage volumes for this deterministic expected set of filesystems. In some embodiments, the system manager 190 keeps track of storage resource 130 usage levels and, if the storage system is close to running out of storage resources may reduce the threshold number of pre-provisioned storage volumes to prevent the pre-provisioned storage volumes from using excessive storage resources on the storage system.

Figure 4:
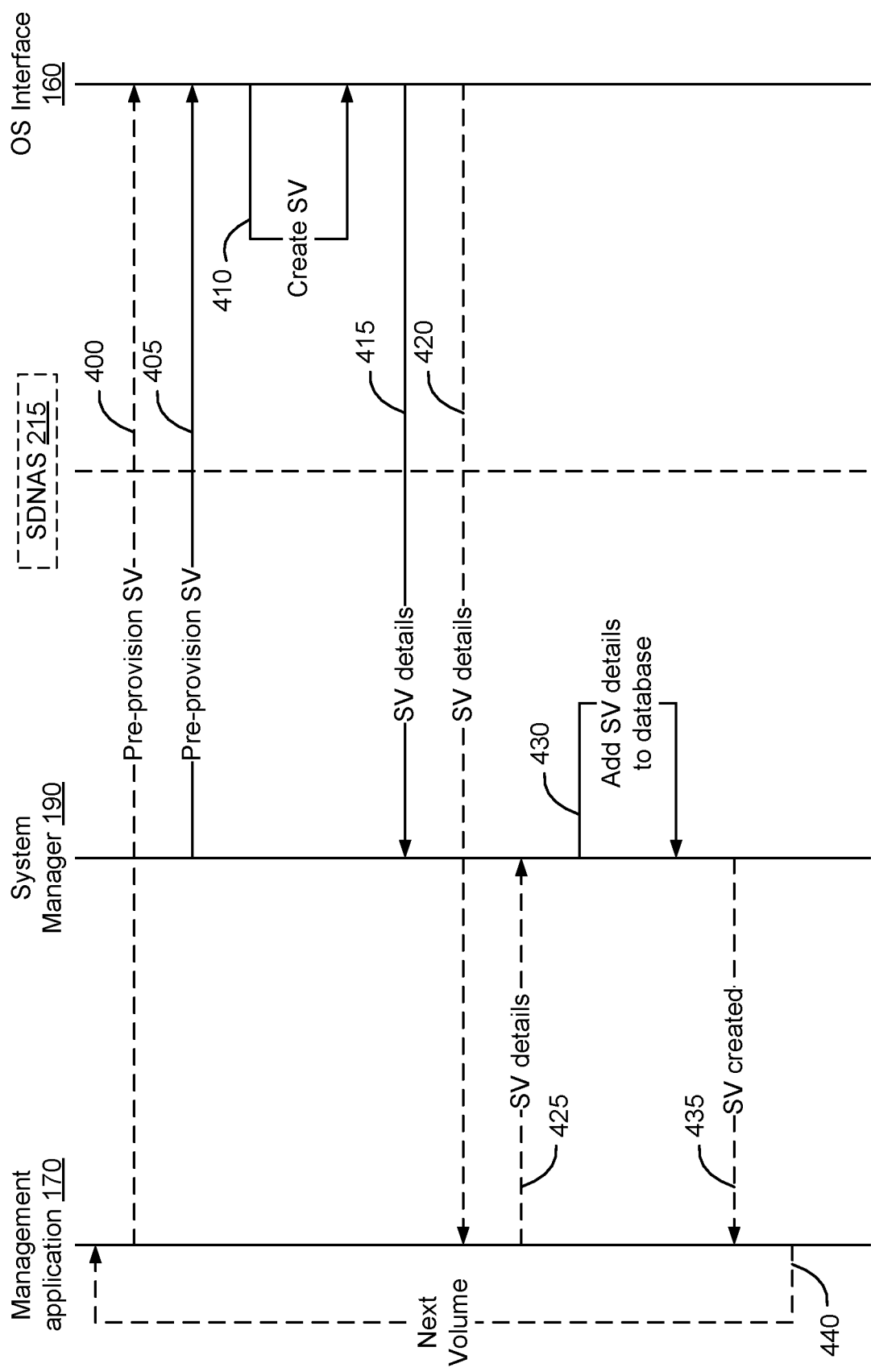
FIG. 4 is a swim-lane diagram showing interaction between a set of components of a storage system in connection with pre-provisioning a set of storage volumes on a storage system, according to some embodiments.

FIG. 4 is a swim-lane diagram showing interaction between a set of components of a storage system in connection with pre-provisioning a set of storage volumes on a storage system, according to some embodiments. As shown in FIG. 4, in some embodiments the management application 170 or the system manger 190 sends an instruction (arrow 400, 405) to the OS interface 160 to request creation of a pre-provisioned Storage Volume (SV). In embodiments where the storage volume is being pre-created manually in response to a request from a user, the instruction (arrow 400) originates at the management application 170. In embodiments where the storage volume is being automatically created, the instruction (arrow 405) originates at the system manager 190.

In response to receipt of the instruction to create the storage volume (arrow 400 or arrow 405) the OS interface 160 executes system calls on the underlying operating system 150 to create the storage volume (arrow 410). The particular details associated with how the storage volume is created will depend on the particular implementation and, accordingly, have not been described in detail to avoid obfuscation of the invention.

Once the storage volume has been created, the storage volume details are sent back to the system that originated the storage volume creation request. For example, if the storage volume creation request originated at the system manager 190, the storage volume (SV) details are returned to the system manager 190 (arrow 415). The system manager 190 adds details about the storage volume to into the management database 425 (arrow 430). If the storage volume creation request originated at the management application 170, the storage volume (SV) details are returned to the management application 170 (arrow 420). Where the storage volume was pre-provisioned, the management application 170 sends a message to with the storage volume details to the system manager 190 (arrow 425) to enable details about the storage volume to be inserted into the management database 425 (arrow 430). Optionally, when a storage volume is created by either the system manager 190 or management application 170, a confirmation message may be sent to the management application 170 (arrow 435) confirming that details about the storage volume have been added to the management database 245.

Where multiple storage volumes are required to be created, in some embodiments each storage volume is individually created using the process described in connection with FIG. 4 (arrows 400-435). Accordingly, if there are additional storage volumes to be created, the process returns (arrow 440) to create a subsequent storage volume.

Figure 5:
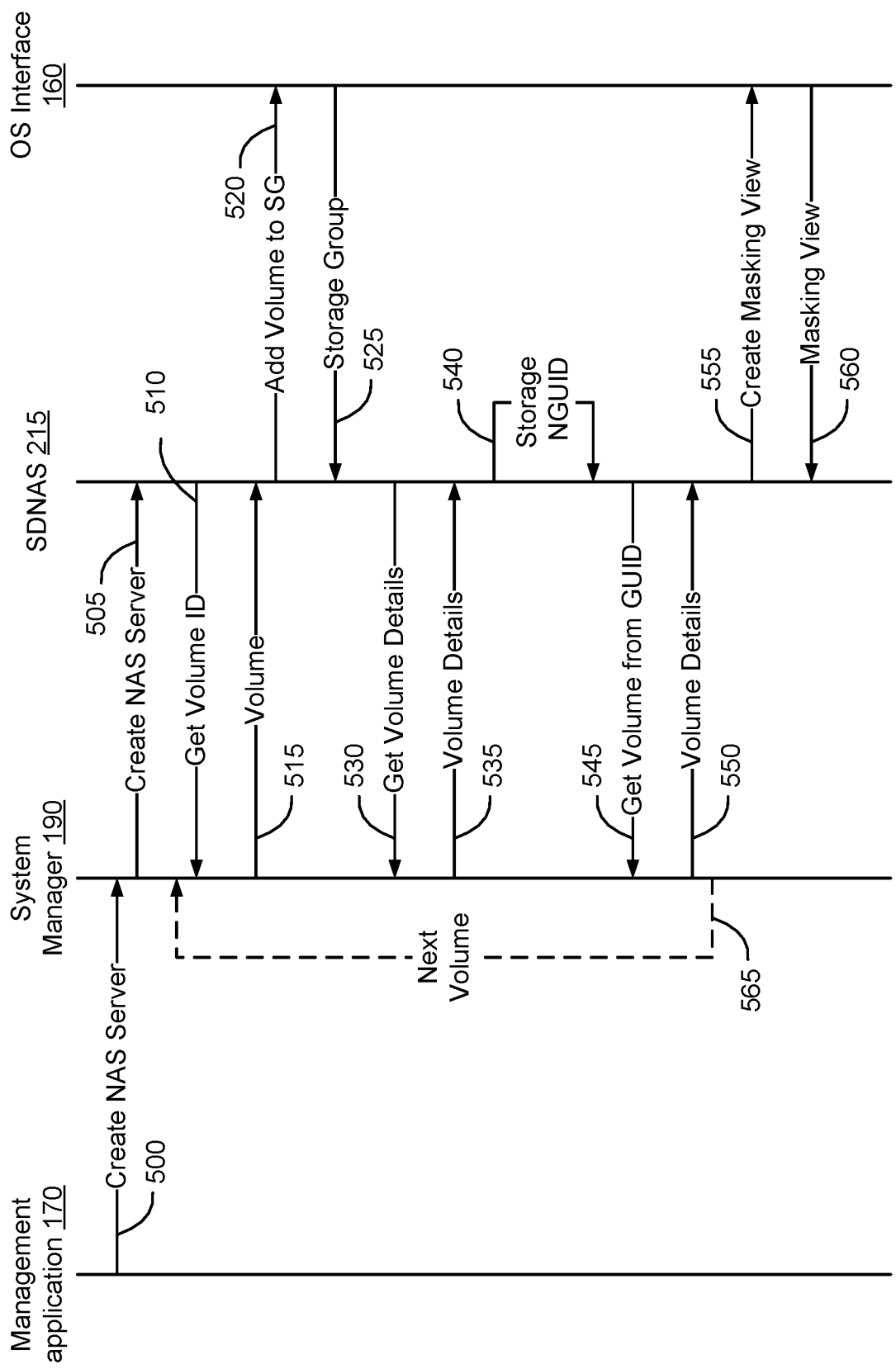
FIG. 5 is a swim-lane diagram showing interaction between a set of components of a storage system in connection with creating a Network Attached Storage (NAS) instance on a storage system using pre-provisioned storage volumes, according to some embodiments.

FIG. 5 is a swim-lane diagram showing interaction between a set of components of a storage system in connection with creating a Network Attached Storage (NAS) instance 215 on a storage system 100 using pre-provisioned storage volumes, according to some embodiments. As shown in FIG. 5, in some embodiments creation of a NAS server or SDNAS instance (collectively referred to herein as a NAS instance), uses pre-provisioned storage volumes to accelerate creation of the NAS instance. Since the storage volumes are pre-provisioned, the signaling process described above in connection with FIG. 4 is not required to be implemented after receipt of a request to create the NAS instance. Since creating storage volumes is computationally intensive, and can take on the order of 20 seconds to create each storage volume, using pre-provisioned storage volumes can greatly increase the responsiveness of the storage system to the NAS_Server_Create commands. Further, in an environment where the operating system interface or other layers are busy, using pre-provisioned storage volumes can greatly reduce the chance that creation of the NAS instance will fail, thus increasing the reliability of the storage system.

As shown in FIG. 5, in some embodiments a management application 170 sends an instruction to the system manager 190 to create a NAS server on the storage system (arrow 500). For example, a user may send a command via a user interface or command line interface of the management application 205 to create a NAS instance such as a NAS server or SDNAS instance on the storage system and, in response, the management application 170 sends a Create NAS Server Instruction (arrow 500).

The system manager 190 sends an instruction to the SDNAS process 215 to create the NAS server (arrow 505). In some embodiments, the SDNAS process 215 needs at least three storage volumes—a first storage volume for the root filesystem, a second storage volume for the config filesystem, and a third storage volume for a data filesystem. Accordingly, for each required storage volume, the SDNAS process 215 sends a request to the system manager 190 to get a storage volume ID of a pre-provisioned storage volume (arrow 510). In some embodiments, the request (arrow 510) includes details such as the ID of the SDNAS process 215, an indication that the request is for a pre-provisioned storage volume that is "not in use", and a size of the requested storage volume. For example, if the pre-provisioned storage volume is to be used to hold the root filesystem, in some embodiments the size parameter is set to 3 G. In response, the system manager 190 selects a pre-provisioned storage volume of the requested size (if available) and responds with the volume ID (arrow 515). If the system manager 190 doesn't have any pre-provisioned storage volumes of the requested size, the system manager 190 in some embodiments will allocate a pre-provisioned storage volume having a different size and the SDNAS process can subsequently implement a resizing operation (see FIG. 6) of the allocated pre-provisioned storage volume.

The SDNAS process 215 then sends a request to the OS interface 160 to request that the allocated pre-created storage volume be added to a storage group for the SDNAS process (arrow 520). In response, the OS interface creates a storage group for the SDNAS process 215 and responds with the identity of the storage group (arrow 525).

The SDNAS process 215 then sends a request for the volume details to the system manager 190 (arrow 530) and the system manager 190 responds with the storage volume details (arrow 535). Although FIG. 5 shows the SDNAS process sending two requests to the system manager 190, a first request for the storage volume ID (arrow 510) and a second request for the storage volume details (arrow 530), in some embodiments these may be combined into a single request.

The SDNAS process 215 assigns the allocated pre-provisioned storage volume a Namespace Globally Unique ID (NGUID) (arrow 540) and transmits the identity of the NGUID to the system manager 190 (arrow 545). The system manager responds with the Globally Unique ID of the pre-provisioned storage volume (arrow 550).

The SDNAS process 215 then sends a request to the OS interface 160 to request creation of a masking view (arrow 555). Creation of a masking view enables the storage volumes of the storage group to be made visible to the SDNAS process 215. In some embodiments, to create a masking view, a process needs a storage group, a port group, and an initiator group. The storage group contains the devices that are to be made visible to the SDNAS process 215. The port group contains the storage front-end ports on which the storage volumes will be visible. The initiator group contains the host bus adapter ports WWNs that are used to access the storage volume. Once the masking view is created, the OS interface 160 responds to the SDNAS process.

The process described in FIG. 5 (arrows 510-550) is repeated for each storage volume required by the SDNAS process 215. For example, if the SDNAS process requires three storage volumes, the process shown in arrows 510-550 will be repeated three times (arrow 565). However, since the storage volumes that are assigned to the SDNAS process 215 are pre-provisioned, it is not necessary to implement the storage volume creation process described in connection with FIG. 4 during the process of creating the NAS server. Accordingly, creation of the NAS server is accelerated significantly while allowing a background process to be used to pre-provision storage volumes in advance of initiation of creation of the NAS server. This reduces the likelihood that the instruction to create the NAS server (arrow 500) will fail, thus making the storage system more resilient as well as more responsive.

FIG. 6 is a swim-lane diagram showing interaction between a set of components of a storage system in connection with increasing a size of a pre-provisioned file system. Example instances where a pre-provisioned storage volume may need to be resized will be described in connection with assigning a pre-provisioned storage volume to a snapshot of a filesystem. Other use cases may exist as well and, accordingly, the process of re-sizing a pre-provisioned storage volume may be used in other contexts as well.

As shown in FIG. 1, in some embodiments the storage system 100 has a snapshot subsystem 180, which may be implemented as a snapshot application executing in an emulation 200 and configured to enable the storage system 100 to provide point in time data copying. Multiple snapshot applications may be executing on a given storage system 100 at any point in time. A "snapshot," as that term is used herein, is a copy of data as that data existed at a particular point in time. A snapshot of a file system, accordingly, is a copy of the data of the file system as the data contained in the file system existed at the point in time when the snapshot of the file system was created. In some embodiments, the storage system 100 creates snapshot copies of user file systems by copying data at the block level on physical storage resources 132 that are being used to implement the storage volume that contains the user file system. Each time a snapshot copy is created, it is stored in a storage volume that needs to be created on the storage system. If the user file system needs to be restored to an earlier point in time, one of the snapshot copies may be selected and the user file system may be remounted from the snapshot copy of the user file system as the user file system appeared at the time of creation of the snapshot copy of the user file system.

A snapshot of a user file system can be a complete copy of the user file system, or can contain only the changes that have been made to the user filesystem since creation of a previous snapshot. Because snapshot copies of a user filesystem are based on the size of the user filesystem and the number of changes to the user filesystem, it is often not possible to determine, in advance, what size storage volume will be needed to store a snapshot copy of a user filesystem. However, it is still beneficial to pre-provision storage volumes for use by the snapshot application, since modification of a storage volume's size is much less computationally intensive for the operating system than creating a storage volume. Hence, in some embodiments, the system manager 190 determines how many snapshots will be created in an upcoming time period (See FIGS. 8 and 9) and, in response to creation of a snapshot, allocates a pre-provisioned storage volume to the snapshot application to be used to hold the snapshot of the user filesystem.

As shown in FIG. 6, in this example it is assumed that the snapshot application has initiated creation of a snapshot of a user filesystem that has a size of 5 Terrabytes (5 T). Accordingly, the snapshot application sends a request via the management application 170 to the system manager 190 to create a filesystem with a size of 5 T (arrow 600). The system manager 190 sends an instruction to the SDNAS process 215 to create the filesystem (arrow 605). The SDNAS 215 sends a request to the system manager 190 for allocation of a pre-provisioned storage volume (arrow 610). In some embodiments, the system manager pre-provisions storage volumes for use with user filesystems with a fixed size of, for example, 100M. Accordingly, in some embodiments, since the SDNAS process 215 knows that the filesystem that is being created is a user filesystem, the SDNAS process requests allocation of a pre-provisioned storage volume having a size of 100M. In response, the system manager 190 selects a pre-provisioned storage volume of the requested size and responds with the volume ID (arrow 615).

The SDNAS process then sends an instruction to the OS interface 160 to modify the size of the storage volume (arrow 620). The OS interface implements the requested size change on the identified storage volume, and responds to the SDNAS process with a success/failure indication (arrow 625). The SDNAS process, in some embodiments, notifies the system manager 190 of the change in size of the allocated pre-provisioned storage volume (arrow 630).

The SDNAS process 215 then sends a request to the OS interface 160 to request that the allocated pre-created storage volume be added to one of the storage groups used by the SDNAS process (arrow 635). In response, the OS interface adds the allocated pre-provisioned storage volume to a storage group and responds with the identity of the storage group that is being used to hold the storage volume (arrow 640).

In some embodiments, the storage volume might be added to the same storage group that the SDNAS process 215 uses to hold other storage volumes, or the pre-allocated storage volume might be added to a new or different storage group, depending on the service level requirements associated with the filesystem that is being created. If the allocated pre-created storage volume is being added to an existing storage group, a new masking view is not required. If the allocated pre-created storage volume is being added to a new storage group, the SDNAS process will also need to create a new masking view on the storage system. In FIG. 6 it is assumed that the storage volume is being added to an existing storage group and, accordingly, FIG. 6 does not show creation of a masking view. If a masking view is required, a process shown in FIG. 5 (arrows 555, 560) may be used.

The SDNAS process 215 then sends a request for the volume details to the system manager 190 (arrow 645) and the system manager 190 responds with the storage volume details (arrow 650). Although FIG. 6 shows the SDNAS process sending two requests to the system manager 190, a first request for the storage volume ID (arrow 610) and a second request for the storage volume details (arrow 645), in some embodiments these may be combined into a single request.

The SDNAS process 215 assigns the allocated pre-provisioned storage volume a Namespace Globally Unique ID (NGUID) (arrow 655) and transmits the identity of the NGUID to the system manager 190 (arrow 660). The system manager responds with the Globally Unique ID of the pre-provisioned storage volume (arrow 665).

Whenever a pre-provisioned storage volume is allocated by the system manager 190 to a SDNAS process 215, the allocated storage volume is removed from the system manager database 245. To enable the system manager to create sufficient pre-provisioned storage volumes, in some embodiments the system manager has background processes that monitor the frequency that storage volumes are requested on the storage system. Storage volumes are often requested in connection with creation of new NAS instances, adding new user filesystems to existing NAS instances, and in connection with creating snapshot copies of existing user filesystems.

According to some embodiments, the system manager monitors NAS instance creation and addition of filesystems to existing NAS instances for an extended period of time, for example over a 25 day period, and uses a machine learning algorithm to learn a linear regression of storage volume allocation on the storage system due to NAS instance creation and adding filesystems to existing NAS instances.

FIG. 7 is a table containing pseudocode configured to determine how many storage volumes should be pre-provisioned on a storage system based on historical storage volume consumption, according to some embodiments. As shown in FIG. 7, in some embodiments the system manager 190 creates a list of the filesystem creation time over the previous time period which, in this instance, happens to be 25 days (instruction 700). Other intervals could be used as well, such as over a previous week, two week period, month, etc. The list is then used to generate a probabilistic estimate of how many storage volumes should be pre-provisioned based on a linear regression between the frequency of filesystem creation over time and the current estimated time period. For example, if the system manager 190 executes the process shown in FIG. 7 once per day, the "estimated time period" is the upcoming day, and the system manager 190 will determine how many storage volumes to pre-provision based on the linear regression between historical filesystem creation and time (instruction 702).

The system manager also uses the same process to determine how many NAS instances are likely to be created over the upcoming time interval. For example, in in some embodiments the system manager 190 creates a list of the creation time of the NAS instances that were created over a previous time period which, in this instance, happens to be 25 days (instruction 704). Other intervals could be used as well, such as over a previous week, two week period, month, etc. The list of NAS instance creations is then used to generate a probabilistic estimate of how many NAS instances are expected during an upcoming time interval based on a linear regression between the frequency of NAS instance creation over time and the current estimated time period. For example, if the system manager 190 executes the process shown in FIG. 7 once per day, the "estimated time period" is the upcoming day, and system manager 190 will determine how many NAS instances are expected to be created in the next day based on the linear regression between historical NAS instance creation and time (instruction 706).

The system manager also determines the number of unutilized volumes (instruction 708). Unutilized volumes, in this context, are storage volumes that have been previously pre-provisioned and have not yet been allocated by the system manager 190 to a SDNAS process 215. The system manger then determines how many storage volumes to pre-provision for the upcoming estimated time period based on the expected number of NAS instances that are expected to be created times two, because each NAS instance requires two storage volumes, plus the expected number of other filesystems that are going to be created during the upcoming estimated time period, minus the existing pre-provisioned storage volumes that exist in the database and have not yet been allocated to a NAS process (instruction 710).

For example, assume that NAS instance creation and filesystem creation were monitored over a 25 day rolling window, and the linear regressions learned over the 25 day window indicated that three NAS instances and twelve filesystems are expected to be created in the following day. If the system manager 190 currently has 8 previously created storage volumes, the system manager will determine that it should pre-provision 10 new storage volumes: (3 NAS instances×2 storage volumes per NAS instance)+(12 filesystems×1 storage volume per filesystem)=a prediction that 18 storage volumes will be needed in the upcoming one-day time period. However, the system manager already has 8 previously pre-created storage volumes and, hence, 18 expected−8 existing=10 new. Optionally the system manger may pre-create several additional storage volumes over and above what is predicted to be required.

Although some embodiments have been described in which the system manager predicts periodically how many storage volumes will be required in an upcoming time period, in some embodiments the system manager 190 is configured to always have at least a minimum number of storage volumes pre-provisioned and stored in the management database 245. For example, the system manager 190 may always have a threshold number such as 10 storage volumes pre-provisioned on the storage system. Other thresholds may be used as well depending on the implementation. If the storage manager 190 detects that the number of pre-provisioned storage volumes drops below the threshold, the storage manager in some embodiments is configured to pre-provision an additional set of storage volumes to ensure that pre-provisioned storage volumes are likely to be available when needed.

In addition to determining how many storage volumes are likely to be needed by NAS instance creation and user filesystem creation, in some embodiments the system manager 190 also determines how many storage volumes will be needed in an upcoming time interval in connection with filesystems that are created on a fixed time schedule. One example of filesystems that may be created on a pre-defined schedule are snapshot filesystems. In some embodiments, the system manager 190 calculates a deterministic number of storage volumes that should be pre-provisinoed in an "upcoming time interval" based on the number of filesystems that are scheduled to be created during that upcoming time interval. An example is provided in connection with FIGS. 8 and 9 in which the upcoming time interval is a half hour, and the deterministic number of pre-provisioned storage volumes is determined by looking at the number of snapshot filesystems that will be generated during the upcoming time interval based on snapshot policies. It should be understood that other ways of determining how storage volumes should be pre-provisioned in an upcoming time interval may be utilized as well.

Figure 8:
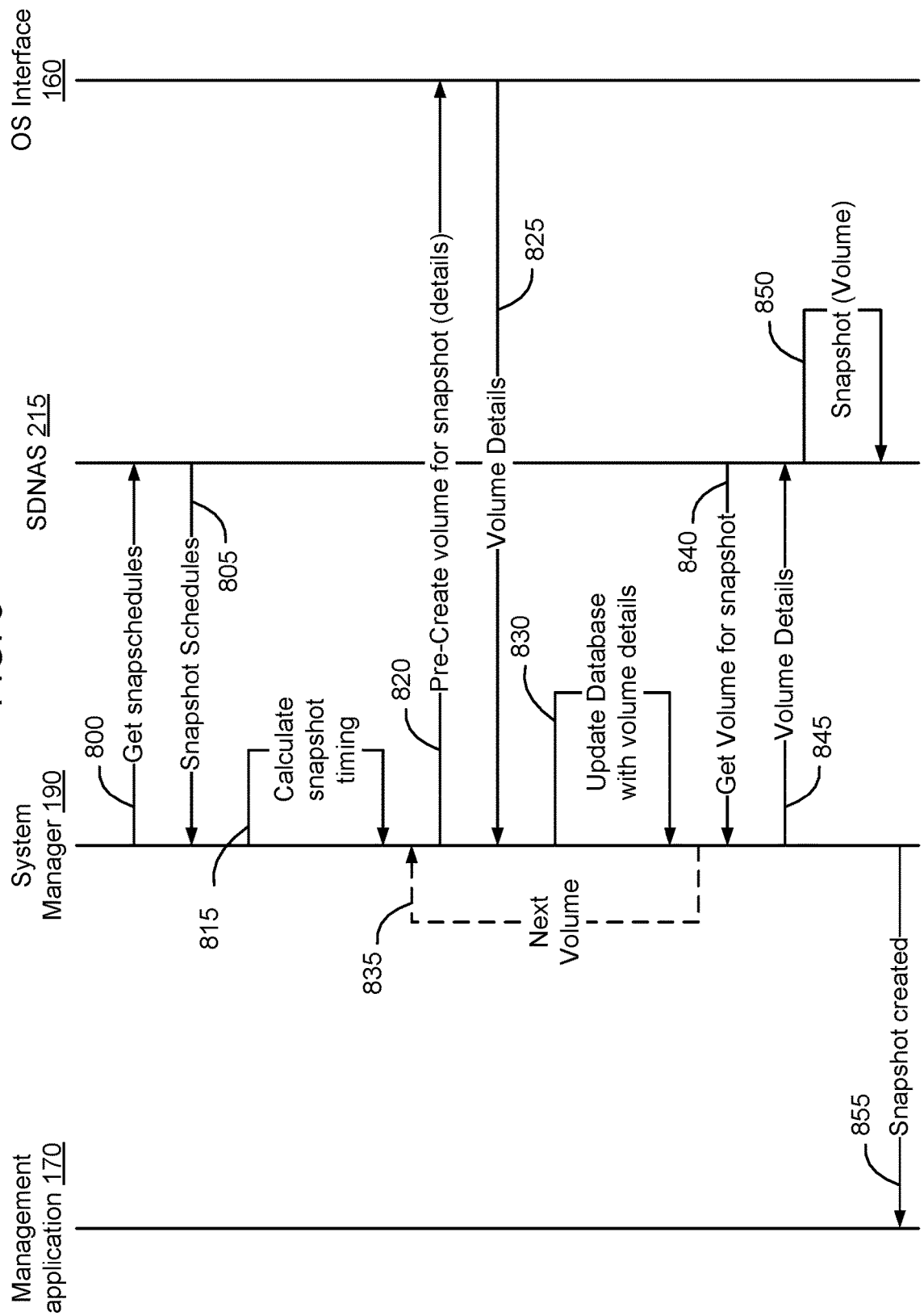
FIG. 8 is a swim-lane diagram showing interaction between a set of components of a storage system in connection with determining how many storage volumes should be pre-provisioned on a storage system based on an expected number of snapshots that will be created in an upcoming time interval, according to some embodiments.

FIG. 8 is a swim-lane diagram showing interaction between a set of components of a storage system in connection with determining how many storage volumes should be pre-provisioned on a storage system based on an expected number of snapshots that will be created in an upcoming time interval, according to some embodiments. As shown in FIG. 8, in some embodiments, the system manager 190 obtains snapshot schedules from each SDNAS process 215 (arrow 800). In some embodiments the SDNAS processes set snapshot policies on storage groups, such that the snapshot policy on the storage group causes the snapshot subsystem 180 to create a snapshot of each storage volume contained in the storage group on a periodic basis. By retrieving the snapshot schedules from the SDNAS processes 215, the system manager 190 is able to retrieve all snapshot policies used by the SDNAS processes 215 to thereby know when snapshots will be created on each of the storage volumes of each of the storage groups. Accordingly, as shown in FIG. 8, the SDNAS processes 215 return the set of snapshot schedules to the system manager 190 (arrow 805).

The system manager 190 calculates snapshot creation timing based on the snapshot schedules (arrow 815), and determines from the snapshot schedules how many snapshots will be created by the set of SDNAS processes 215 in the upcoming time interval. For example, if the system manager determines that four of the SDNAS processes have snapshot policies that will cause snapshots to be created on a total of 7 storage groups, and that there are four storage volumes in each of the seven storage groups, the system manager 190 will know that it will need to pre-create 28 storage volumes for use in connection with creation of snapshots during the next upcoming half hour time interval.

After determining the expected number of snapshots that will require storage volumes in the upcoming time interval, the system manager will pre-create the determined number of storage volumes for snapshot usage during the upcoming time interval. For example, as shown in FIG. 7, in embodiments where each storage volume is created individually, the system manager 190 sends an instruction to the OS interface 160 to pre-create a storage volume (arrow 820). When the storage volume is created in the operating system, the OS interface 160 responds with the storage volume details (arrow 825) that are added to the management database 245 (arrow 830). This process is iterated for each storage volume (arrow 835) until the system manager 190 has pre-provisioned the correct number of storage volumes to accommodate the number of snapshots that are expected to be created in the upcoming time interval.

When a snapshot is created, instead of having the snapshot subsystem 180 or the SDNAS process 215 request creation of a storage volume for the snapshot, the SDNAS process 215 instead sends a request to the system manager 190 for a storage volume (arrow 840). The system manger responds with the storage volume details (arrow 845) and the allocated storage volume is then used in connection with creation of the snapshot (arrow 850). FIG. 6 provides additional details associated with use of a pre-provisioned storage volume in connection with creation of a snapshot, and shows a process that may be used to re-size the pre-provisioned storage volume based on the size of the snapshot. Since snapshot creation can causes write operations on the user filesystem to quiesce, using pre-provisioned storage volumes to implement snapshot creation can accelerate snapshot creation, thus reducing the impact of snapshot creation on the user filesystem. Optionally, once a snapshot has been created, the system manger or the SDNAS process 215 can provide notice to the management application 170 (arrow 855).

FIG. 9 is a table containing pseudocode configured to determine how many storage volumes should be pre-provisioned on a storage system based on an expected number of snapshots that will be created in an upcoming time interval. In particular, FIG. 9 provides additional details about the process used by the system manager 190 in connection with calculating snapshot timing (FIG. 8, arrow 815).

As shown in FIG. 9, in some embodiments the system manager 190 has a 30 minute timer (instruction 900) and, at the end of every 30 minute period, runs a snapshot estimator process to determine the number of snapshots that will be created in the upcoming 30 minute period.

As shown in FIG. 9, in some embodiments the snapshot estimator process gets a list of all snapshot schedules (instruction 902). The snapshot estimator process sets the current time (instruction 904) and the interval over which the snapshot creation is to be determined which, in this example, is 30 minutes (instruction 906).

The snapshot estimator process then orders the snapshots according to the time of day, and day of the week, when snapshots will be created, according to the set of snapshot policies (instructions 908). The snapshot estimator process then determines if a snapshot will be created in the upcoming tine interval, by determining if the snapshot creation schedule time is greater than the current time and less than the current time plus 30 minutes (instruction 910). In some embodiments, the snapshot estimator process determines the size of the snapshot filesystem that will be created (instruction 912) and adds a storage volume to the list of storage volumes that are to be pre-provisioned. Since the system manager knows the identity of the SDNAS process that will be associated with the snapshot filesystem, and the size of the snapshot filesystem, when the pre-provisioned storage volume is created, it can be stored in the database with the SDNAS process ID. Then, when the SDNAS process asks the system manager 190 for allocation of a pre-provisioned storage volume (FIG. 6, arrow 610), the system manager can allocate the pre-provisioned storage volume to the SDNAS process that was created for this particular snapshot. This makes it easier to pre-provision storage volumes for snapshots that are approximately the correct size, thus reducing the number of volume size modification operations (FIG. 6, arrow 620) that are required to be implemented in connection with snapshot creation operations.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated. The term "about" is used to indicate that a value includes the standard level of error for the device or method being employed to determine the value. The use of the term "or" in the claims is used to mean "and/or" unless explicitly indicated to refer to alternatives only or the alternatives are mutually exclusive, although the disclosure supports a definition that refers to only alternatives and to "and/or." The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A non-transitory tangible computer readable storage medium having stored thereon a computer program for performance efficient and resilient creation of network attached storage objects on a storage system, the computer program including a set of instructions which, when executed by a computer, cause the computer to perform a method comprising the steps of:
   determining a number of storage volumes to pre-provision in an operating system of the storage system;
   interacting with an operating system interface to pre-provision the number of storage volumes in the operating system of the storage system;
   after the number of storage volumes are pre-provisioned, receiving a request for a storage volume; and
   allocating one of the pre-provisioned storage volumes in response to receipt of the request for the storage volume;
   wherein determining the number of storage volumes to pre-provision in the operating system of the storage system includes a first component based on a regression between storage volume usage and time, and a second component deterministically based on scheduled filesystem creation events in an upcoming time interval.

2. The non-transitory tangible computer readable storage medium of claim 1, wherein the regression is based on historical Software Defined Network Attached Storage (SDNAS) instance creation over time in a preceding monitoring period, and historical user filesystem creation over the preceding monitoring period.

3. The non-transitory tangible computer readable storage medium of claim 1, wherein the second component is based on a set of snapshot policies defining snapshot creation events on a set of storage groups.

4. The non-transitory tangible computer readable storage medium of claim 1, wherein interacting with the operating system to pre-provision the number of storage volumes in the operating system of the storage system occurs iteratively by individually creating each of the pre-provisioned storage volumes in the operating system of the storage system.

5. The non-transitory tangible computer readable storage medium of claim 1, further comprising storing details about the pre-provisioned storage volumes in a database, and wherein the step of allocating one of the pre-provisioned storage volumes in response to receipt of the request for the storage volume comprises providing a requesting process with details about the allocated one of the pre-provisioned storage volumes.

6. The non-transitory tangible computer readable storage medium of claim 1, further comprising interacting with the operating system interface to change a size of the allocated one of the pre-provisioned storage volumes.

7. The non-transitory tangible computer readable storage medium of claim 6, wherein the step of interacting with the operating system interface to change the size of the allocated one of the pre-provisioned storage volumes is implemented after then step of allocating the one of the pre-provisioned storage volumes.

8. A method of performance efficient and resilient creation of network attached storage objects on a storage system, comprising the steps of:
   determining a number of storage volumes to pre-provision in an operating system of the storage system;
   interacting with an operating system interface to pre-provision the number of storage volumes in the operating system of the storage system;
   after the number of storage volumes are pre-provisioned, receiving a request for a storage volume; and
   allocating one of the pre-provisioned storage volumes in response to receipt of the request for the storage volume;
   wherein determining the number of storage volumes to pre-provision in the operating system of the storage system includes a first component based on a regression between storage volume usage and time, and a second component deterministically based on scheduled filesystem creation events in an upcoming time interval.

9. The method of claim 8, wherein the regression is based on historical Software Defined Network Attached Storage (SDNAS) instance creation over time in a preceding monitoring period, and historical user filesystem creation over the preceding monitoring period.

10. The method of claim 8, wherein the second component is based on a set of snapshot policies defining snapshot creation events on a set of storage groups.

11. The method of claim 8, wherein interacting with the operating system to pre-provision the number of storage volumes in the operating system of the storage system occurs iteratively by individually creating each of the pre-provisioned storage volumes in the operating system of the storage system.

12. The method of claim 8, further comprising storing details about the pre-provisioned storage volumes in a database, and wherein the step of allocating one of the pre-provisioned storage volumes in response to receipt of the request for the storage volume comprises providing a requesting process with details about the allocated one of the pre-provisioned storage volumes.

13. The method of claim 8, further comprising interacting with the operating system interface to change a size of the allocated one of the pre-provisioned storage volumes.

14. The method of claim 13, wherein the step of interacting with the operating system interface to change the size of the allocated one of the pre-provisioned storage volumes is implemented after then step of allocating the one of the pre-provisioned storage volumes.

* * * * *

UNITED STATES PATENT AND TRADEMARK OFFICE
CERTIFICATE OF CORRECTION

| | | |
|---|---|---|
| PATENT NO. | : 11,907,551 B2 | Page 1 of 1 |
| APPLICATION NO. | : 17/855901 | |
| DATED | : February 20, 2024 | |
| INVENTOR(S) | : Maneesh Singhal and Venu Madhava Gunda | |

It is certified that error appears in the above-identified patent and that said Letters Patent is hereby corrected as shown below:

In the Claims

Column 18, Line 17, Claim 7 change "then" to --the--.
Column 19, Line 1, Claim 14 change "then" to --the--.

Signed and Sealed this
Nineteenth Day of March, 2024

Katherine Kelly Vidal
*Director of the United States Patent and Trademark Office*